United States Patent [19]

Coleman

[11] 4,368,285

[45] Jan. 11, 1983

[54] FAST CRYSTALLIZING POLYETHYLENE TEREPHTHALATE CONTAINING NEOPENTYL DIBENZOATE

[75] Inventor: Ernest A. Coleman, Kinnelon, N.J.

[73] Assignee: Dart Industries Inc., Northbrook, Ill.

[21] Appl. No.: 327,852

[22] Filed: Dec. 7, 1981

[51] Int. Cl.[3] .......................... C08K 9/00; C08K 10/00

[52] U.S. Cl. .................................... 524/293; 524/494; 524/605; 525/437

[58] Field of Search ........................ 524/293, 605, 494; 525/437; 528/309

[56] References Cited

U.S. PATENT DOCUMENTS

| | | | |
|---|---|---|---|
| 3,575,931 | 4/1971 | Sherman | 524/605 |
| 3,673,139 | 6/1972 | Hrach | 524/285 X |
| 4,136,089 | 1/1979 | Bier et al. | 528/309 |
| 4,168,259 | 9/1979 | Coleman | 524/605 X |
| 4,223,126 | 9/1980 | Keck | 528/309 |

*Primary Examiner*—Lucille M. Phynes

*Attorney, Agent, or Firm*—Bryant W. Brennan; Leigh B. Taylor

[57] ABSTRACT

Polyethylene terephthalate molding compositions characterized by rapid crystallization are provided by combining polyethylene terephthalate and a filler or reinforcing agent with a crystallization-rate promoter comprising neopentyl dibenzoate.

6 Claims, No Drawings

FAST CRYSTALLIZING POLYETHYLENE TEREPHTHALATE CONTAINING NEOPENTYL DIBENZOATE

BACKGROUND OF THE INVENTION

Polyethylene terephthalate homopolymers and copolymers are characterized by excellent physical properties which make them materials of great interest for use in films, fibers and molding applications. Reinforcing materials such as glass fibers are frequently incorporated in order to improve the mechanical properties of the final products prepared from polyethylene terephthalate.

It has been found, however, that the relatively slow rate of crystallization of polyethylene terephthalate and the copolymers thereof greatly limits the use of such polyester composition in injection molding processes. Hence, a great deal of effort has been expended on the discovery of promoters which will accelerate the crystallization rate of polyethylene terephthalate and of its copolymers. Among the various patents which have issued on the accelerations of polyethylene terephthalate and which discuss the efforts of the prior art to overcome the crystallization rate disadvantages of these polyesters there may be mentioned U.S. Pat. Nos. 3,673,139; 4,098,845; 4,107,149; and 4,136,089. In addition, mention can be made of British Pat. No. 1,505,599 and German Pat. Nos. 2,545,720; 2,653,120; 2,706,123; 2,706,124; and 2,706,128. As is evident from these aforementioned patents, the efforts of the prior art have concentrated on the development of specific additives or promoters which will enhance the crystallization rates of polyethylene terephthalate homopolymers and copolymers. However, the rigorous demands of injection molding procedures and the economic factors involved in this field of technology are such that the provision of further means for enhancing the crystallization rates of such polyesters is constantly encouraged.

SUMMARY OF THE INVENTION

It has been found in accordance with the present invention that the crystallization rate of polyethylene terephthalate homopolymers and copolymers per se and in molding compositions containing these polyesters can be improved by the addition of neopentyl dibenzoate to polyethylene terephthalate and to compositions containing polyethylene terephthalate and its homo- or copolymers. The incorporation of neopentyl dibenzoate with the polyethylene terephthalate material enables the realization of a fast crystallizable polyethylene terephthalate eminently suitable for injection molding procedures.

The compositions containing neopentyl dibenzoate, glass fibers and polyethylene terephthalate material can be prepared according to procedures known to those skilled in the art. However, it has been found most advantageous to dry blend the materials and extrude the resulting blend in order to mix and pelletize the blended composition. It has been found to be advantageous to carry out the compounding of the molding composition in two or more stages rather than in a single stage.

DETAILED DESCRIPTION OF THE INVENTION

In accordance with the present invention, it has been found that neopentyl dibenzoate is an effective promoter of the crystallization rate of polyethylene terephthalate and its homo- or copolymers thereby rendering polyethylene terephthalate utilizable over a wider range of conditions and applications. It can be added to the polyethylene terephthalate at concentrations of from about 0.1% to about 20.0% by weight of the polyethylene terephthalate. However, it is preferred to add the neopentyl dibenzoate in amounts of from about 0.25% to about 5.0%.

The neopentyl dibenzoate can be added per se to a polyethylene terephthalate composition. However, for achievement of optimum results, it has been found advantageous to prepare a concentrate of neopentyl dibenzoate and polyethylene terephthalate and to add the concentrate to polyethylene terephthalate compositions in an amount calculated to give the desired concentration in the final admixture.

In the general practice of the invention, the compounding of the ingredients is effected by extrusion. However, other means of compounding will suggest themselves to those skilled in the art and are within the comprehension of the present invention.

The following examples are intended only to illustrate the invention and are not to be construed as limiting the invention.

EXAMPLE 1

5 parts of neopentyl dibenzoate and 95 parts of polyethylene terephthalate were dry blended and the resulting mixture was extruded at 270°-300° C. melt temperature to compound and pelletize the blend.

Portions of the resulting concentrate were dry blended with additional amounts of polyethylene terephthalate and extruded at 270°-300° C. melt temperature to give the final neopentyl dibenzoate concentration set forth in Table I. These specimens are identified in the Table as concentrate method of addition.

Further blends of neopentyl dibenzoate with polyethylene terephthalate having the concentrations set forth in Table I were prepared by dry blending followed by extrusion at 270°-300° C. melt temperature. These specimens are identified in the Table as direct method of addition.

TABLE I

| Sample | % Neopentyl Dibenzoate in PET | Method of Addition | | DSC ΔT° C. |
|---|---|---|---|---|
| | | Concentrate | Direct | |
| 1 | 0.25 | X | | 58 |
| 2 | 0.5 | X | | 57 |
| 3 | 2.5 | X | | 48 |
| 4 | 0.25 | | X | 66 |
| 5 | 0.50 | | X | 63 |
| 6 | 2.5 | | X | 57 |

In the slow DSC (Differential Scanning Colorimetry) test, recorded in the Table, slices of resin are cut from at least two molding cubes to a sample weight of 5 mg. The samples are loaded into an aluminum pan and press closed. The pan is heated under nitrogen from room temperature to 285°-290° C. at 40° C./min. The temperature is held at 290° C. for 5 minutes and the aluminum pan pressed to insure good material contact. It is then cooled at 20° C./min to 50° C. or less. The sample is now heated under nitrogen from room temperature at 20° C./min to the melting point. As soon as base line is regained, cooling is begun at 20° C./min. The melting and freezing point curves are recorded.

ΔT is the difference between the melting and freezing points of the DSC thermogram. A low value of ΔT indicates a fast crystallization rate. A ΔT below 60 is generally considered indicative of good molding properties. A more complete consideration of the use of Differential Scanning Colorimetry in determining the crystallization properties of polyethylene terephthalate can be found in the paper "Einfluss verzweigter Codiole auf das Kristallisationsverhalten von aromatischen Polyestern"; P. Bier et al; Die Angewandte Makromolekulare Chemie 65; No. 1005; 1977; pages 1-21, particularly pages 5-12.

EXAMPLE 2

Neopentyl dibenzoate was dry blended with polyethylene terephthalate in the proportions shown in Table I and the blend was extrusion compounded with 30% of glass fiber reinforcement at 270°-300° C. melt temperature.

Test bars of five inches by one-half inch by one-eighth inch were injection molded from the molding compositions prepared above. The test bars were evaluated for crystallization rate, warpage and surface appearance and the results of these evaluations are set forth in Table II.

TABLE II

| Sample No. | % Neopentyl-dibenzoate | Type of Fiberglass 30% | Cycle Time in Secs | Test Bar Surface | Test Bar Warpage |
|---|---|---|---|---|---|
| 1 | 5.0 | G | 80 | Smooth* | None |
| 2 | 5.0 | G | 80 | Smooth | None |
| 3 | 10.0 | G | 30 | Smooth | None |
| 4 | 10.0 | G | 30 | Smooth | None |
| 5 | 20.0 | G | 99 | Rough | Yes |
| 6 | 5.0 | K | 80 | Rough | None |
| 7 | 5.0 | K | 20 | Smooth | None |
| 8 | 10.0 | K | 30 | Smooth | None |
| 9 | 10.0 | K | 20 | Smooth | None |
| 10 | 20.0 | K | 20 | Smooth | None |

*Rough Edges

A cycle time of 80 seconds or less is indicative of a fast crystallization rate and the surface and warpage characteristics are indicative of the molding properties of the composition employed.

The glass fiber reinforcement in Samples 1-5 was G diameter glass fiber, 0.00038 inches. That employed in Samples 6-10 was K diameter glass fiber, 0.00052 inches.

I claim:

1. A composition comprising polyethylene terephthalate and neopentyl dibenzoate.

2. A composition comprising polyethylene terephthalate, neopentyl dibenzoate and fiberglass.

3. A composition according to claim 1, wherein the proportion of neopentyl dibenzoate to polyethylene terephthalate is from about 0.1% to about 20.0%.

4. A composition according to claim 1, wherein the proportion of neopentyl dibenzoate to polyethylene terephthalate is from about 0.25% to about 5.0%.

5. A process for the preparation of a composition comprising polyethylene terephthalate and neopentyl dibenzoate comprising combining a part of the polyethylene terephthalate with neopentyl dibenzoate in an initial stage and combining the remainder of the polyethylene terephthalate with the combination of the first stage in a second stage.

6. A process for the preparation of a composition comprising polyethylene terephthalate and neopentyl dibenzoate comprising combining a part of the polyethylene terephthalate with neopentyl dibenzoate in an initial stage and combining the remainder of the polyethylene terephthalate with the combination of the first stage in two or more incremental additions in subsequent stages.

* * * * *